United States Patent [19]
Shibazaki et al.

[11] 4,175,066
[45] Nov. 20, 1979

[54] DISPERSANT FOR CALCIUM CARBONATE

[75] Inventors: Hiroji Shibazaki, Takarazuka; Setsuji Edagawa; Hisashi Hasegawa, both of Nishinomiya; Takashi Takeuchi; Noboru Moriyama, both of Wakayama; Yukihiro Fukuyama, Naga, all of Japan

[73] Assignee: Kao Soap Co., Ltd., Tokyo, Japan

[21] Appl. No.: 893,696

[22] Filed: Apr. 5, 1978

[30] Foreign Application Priority Data

Apr. 18, 1977 [JP] Japan ................................. 52/44259

[51] Int. Cl.$^2$ ............................................. C08K 3/26
[52] U.S. Cl. ............................... 260/29.6 M; 428/511
[58] Field of Search .................... 260/29.6 H, 29.6 M; 526/271, 317; 428/511

[56] References Cited

U.S. PATENT DOCUMENTS

| | | | |
|---|---|---|---|
| 3,057,811 | 10/1962 | Trachtenburg | 260/29.6 M |
| 3,196,122 | 7/1965 | Evans | 260/29.6 H |
| 3,635,915 | 1/1972 | Gale | 526/271 |
| 3,755,264 | 8/1973 | Testa | 526/271 |
| 3,940,550 | 2/1976 | Delfosse | 428/511 |
| 4,048,380 | 9/1977 | Blakey | 428/511 |
| 4,058,648 | 11/1977 | Louden | 428/511 |

*Primary Examiner*—Paul R. Michl
*Attorney, Agent, or Firm*—Blanchard, Flynn, Thiel, Boutell & Tanis

[57] ABSTRACT

Calcium carbonate is dispersed by a dispersant comprising a salt of an acrylic acid/maleic acid copolymer.

10 Claims, No Drawings

DISPERSANT FOR CALCIUM CARBONATE

BACKGROUND OF THE INVENTION

1. Field of the Invention

The present invention relates to a dispersant for calcium carbonate. More particularly, the invention relates to a dispersant for calcium carbonate comprising a salt of an acrylic acid/maleic acid copolymer.

2. Description of the Prior Art

Precipitated calcium carbonate is mainly prepared by a process comprising calcining limestone together with anthracite coal or coke in a lime kiln to form unslaked lime, adding water to the resulting unslaked lime to form milk of lime and reacting the milk of lime with carbon dioxide gas. Various precipitated calcium carbonate products, differing in the particle size and shape, can be obtained by adjusting the reaction conditions in the above process. More specifically, the particle size can be changed in a relatively broad range of from $0.02$–$0.10\mu$ to $1$–$3\mu$ by adjusting the reaction conditions. Further, the particle shape can also be changed in the range of from a substantially cubic shape to a needle-like shape. Thus, various calcium carbonate products differing in the particle size and shape have been prepared by adjusting the reaction conditions.

When calcium carbonate is used in an aqueous medium, for example, for coating papers or for preparing aqueous paints, it is required that the calcium carbonate particles should have an excellent dispersibility. For example, when calcium carbonate is used for coating a paper, if the dispersibility thereof is poor, the viscosity and flowability of the coating suspension are degraded, a good coating cannot be otained and the printability of the resulting coated paper is very poor, resulting in the occurrence of various troubles. When a coated paper is prepared in this manner, water is removed after the coating is applied. Accordingly, the use of a high concentration pigment suspension having as low a water content as possible is desired. Therefore, a dispersant capable of providing a high concentration suspension having a low viscosity, when only a small amount of the dispersant is used, is eagerly desired in the art. As dispersants capable of meeting this requirement, there have been mainly used sodium pyrophosphate, sodium hexametaphosphate and sodium polyacrylate.

In Japan, finely divided precipitated calcium carbonate is mainly prepared by a process comprising introducing carbon dioxide gas into an aqueous suspension of calcium hydroxide to form calcium carbonate and precipitating the thus-formed calcium carbonate. The finely divided precipitated calcium carbonate prepared according to this process is recovered in the form of a slurry having a solid concentration of 15 to 25 wt. % and water is removed therefrom by a filter press so that the solid concentration is elevated to 40 to 60 wt. %. The resulting water-containing cake is marketed as it is or after it is dried and pulverized to form a powdery product. The above-mentioned cake having a solid concentration of 40 to 60 wt. %, which is obtained by dehydration using a filter press in the above-described process, is very hard and it is not flowable at all. Accordingly, the cake is rendered flowable by adding a dispersant, such as sodium pyrophosphate, sodium hexametaphosphate, sodium polyacrylate or the like. However, these dispersants are still insufficient and defective in that it is difficult to obtain a slurry having a sufficient flowability and a large quantity of the dispersant must be added so as to attain a sufficient flowability.

SUMMARY OF THE INVENTION

We discovered that a salt of an acrylic acid/maleic acid copolymer is effective as a dispersant for calcium carbonate and it is unexpectedly more effective than the prior art dispersants because the foregoing defects are not observed and it can exert a very excellent dispersing effect. It was also found that when a salt of an acrylic acid/maleic acid copolymer (hereinafter referred to as "AM polymer") prepared by copolymerizing acrylic acid with maleic acid so that the monomer molar ratio (acrylic acid/maleic acid) is from 100/5 to 100/200, preferably from 100/10 to 100/100, and the average molecular weight of the copolymer is 1000 to 20,000, preferably 2000 to 10,000, is added to the above-mentioned solid cake having a solid concentration of 40 to 60 wt. %, which is obtained by dehydration of the precipitated calcium carbonate slurry by a filter press, a sufficient dispersing effect can be attained when the amount of AM polymer employed is much smaller than the amount required when the conventional dispersant such as sodium polyacrylate or sodium hexametaphosphate are used, and the effect of improving the flowability obtained by the use of the AM polymer is very high. As the salts of the AM polymer, there are preferably employed an alkali metal salt, such as sodium or potassium, and an ammonium salt. Some of carboxylic groups may be left in the free acid state or they may be in the form of a salt of an alkaline earth metal.

The differences of the capacities of the dispersant according to the present invention in comparison with those of conventional dispersants are described in detail in the Examples given hereinafter, but the excellent properties of the dispersant of the present invention will be apparent from the following experimental data:

The viscosity of a calcium carbonate slurry having a solid concentration of 50 wt. % is very high (higher than 10,000 cps) and this slurry has no substantial flowability. When a conventional dispersant, sodium hexametaphosphate, is added to the slurry in an amount of 5 wt. %, based on the weight of the calcium carbonate, the viscosity of the slurry is reduced to 7000 cps and when sodium polyacrylate is added in an amount of 5 wt. %, based on the weight of the calcium carbonate, the viscosity is reduced to 600 cps. In contrast, when the AM polymer salt of the present invention is added in an amount of 2.0 %, based on the weight of the calcium carbonate, the viscosity of the slurry is reduced to 50 cps.

As will be apparent from the foregoing experimental data, the AM polymer salt of the present invention exerts a sufficient dispersing effect when a much smaller amount thereof is used, in comparison with the results obtained using the conventional dispersants, and the dispersing effect is much higher than that of the conventional dispersants. Accordingly, when the AM polymer salt of the present invention is used as a dispersant, the pigment concentration can be maintained at a much higher level than the pigment concentration attainable by the use of the conventional dispersants, when the comparison is made based on the same slurry viscosity. That is, the water content in the slurry can be reduced when the AM polymer salt of the present invention is used. Accordingly, when the slurry is used for coating paper, the surface condition, printability and other properties are remarkably improved in the resulting coated paper.

The AM polymer salt of the present invention has an excellent dispersing effect for colloidal calcium carbonate having a particle size of 0.02 to 1.00μ, light fine calcium carbonate having a particle size of 1 to 5μ and heavy calcium carbonate having a particle size of 3 to 10μ. Further, the AM polymer salt of the present invention has a high dispersing effect for clay, kaolin, titanium oxide, red iron oxide, zinc flower, aluminum hydroxide, titanium white and other pigments.

When a paper coating composition is prepared by adding the dispersant of the present invention to a slurry of calcium carbonate and/or other pigment, and further adding casein, starch, a vinyl tape synthetic latex or a mixture thereof to the slurry, because the dispersing effect of the dispersant of the present invention is higher than that of a conventional dispersant such as sodium polyacrylate or sodium hexametaphosphate, the intended dispersing effect can be attained when there is used a very small amount of the AM polymer, usually less than ½ of the amount of the conventional dispersant that is required for the same effect. The gloss, whiteness, opacity and other properties of the resulting coated papers are superior or at least similar to those of coated papers prepared by using the conventional dispersants.

The present invention will now be further described in detail by reference to the following illustrative Examples that by no means limit the scope of the invention.

EXAMPLE 1

A predetermined amount of a dispersant and water were added to a cake of precipitated calcium carbonate having a solid concentration of 52% by weight obtained by dewatering a slurry using a filter press. The calcium carbonate was composed of fine particles having a cubic shape and an average particle size of 0.08μ. The amount of water added was selected so that the solid concentration of the system was 50 wt. %. The cake was immersed in a thermostat tank maintained at 25° C. until the temperature was maintained constant for 1 hour, and then it was agitated for 5 minutes by a homogenizing mixer (Type TK manufactured by Tokushu Kiki K. K.). The apparent viscosity was measured by a B-type viscometer (rotor No. 1). When no dispersant was added, the viscosity of the slurry was higher than 10,000 cps. The kinds and amounts of the dispersants used and the test results are shown in Table 1.

Table 1

| Sample No. | Dispersant | Amount of dispersant (% by weight based on CaCO$_3$) | Viscosity (cps) of 50% by weight aqueous slurry of calcium carbonate |
|---|---|---|---|
| Comparative Samples | | | |
| 1 | sodium pyrophosphate | 2.0 | > 10000 |
|  | sodium pyrophosphate | 3.0 | > 10000 |
|  | sodium pyrophosphate | 5.0 | > 10000 |
| 2 | sodium hexametaphosphate | 2.0 | > 10000 |
|  | sodium hexametaphosphate | 3.0 | > 10000 |
|  | sodium hexametaphosphate | 5.0 | 7000 |
| 3 | sodium polyacrylate (molecular weight = 1500) | 1.5 | 7500 |
|  | sodium polyacrylate (molecular weight = 1500) | 2.0 | 2200 |
|  | sodium polyacrylate (molecular weight = 1500 | 3.0 | 1100 |
|  | sodium polyacrylate (molecular weight = 1500 | 5.0 | 800 |
|  | sodium polyacrylate (molecular weight = 1500) | 7.0 | 1000 |
| 4 | sodium polyacrylate (molecular weight = 4000) | 1.5 | 7000 |
|  | sodium polyacrylate (molecular weight = 400 | 2.0 | 2000 |
|  | sodium polyacrylate (molecular weight = 4000) | 3.0 | 1000 |
|  | sodium polyacrylate (molecular weight = 4000) | 5.0 | 600 |
|  | sodium polyacrylate (molecular weight = 4000) | 7.0 | 800 |
| 5 | sodium polyacrylate (molecular weight = 10000) | 1.5 | 8000 |
|  | sodium polyacrylate (molecular weight = 10000) | 2.0 | 6000 |
|  | sodium polyacrylate (molecular weight 1.0 10000) | 3.0 | 3000 |
|  | sodium polyacrylate (molecular weight = 10000) | 5.0 | 1100 |
| 6 | sodium polymaleate (molecular weight = 1500 | 2.0 | > 10000 |
|  | sodium polymaleate (molecular weight = 1500 | 3.0 | 5000 |
|  | sodium polymaleate (molecular weight = 1500 | 5.0 | 1500 |
| Samples of Present Invention | | | |
| 7 | Na salt of acrylic acid/maleic acid copolymer, (molar ratio = 100/25, molecular weight = 4000) | 1.2 | 2500 |
|  |  | 1.5 | 230 |
|  |  | 2.0 | 60 |
|  |  | 3.0 | 60 |
| 8 | Na salt of acrylic acid/maleic acid copolymer, (molar ratio = 100/50, molecular weight = 4000) | 1.0 | 1800 |
|  |  | 1.2 | 1100 |
|  |  | 1.5 | 150 |
|  |  | 2.0 | 50 |
|  |  | 3.0 | 6 |
| 9 | Na salt of acrylic acid/maleic acid copolymer, (molar ratio = 100/100, molecular weight = 4000 | 1.2 | 4000 |
|  |  | 1.5 | 550 |
|  |  | 2.0 | 100 |
|  |  | 3.0 | 120 |
| 10 | Na salt of acrylic acid/maleic acid copolymer, (molar ratio = 100/50 molecular weight = 8000 | 1.2 | 6000 |
|  |  | 1.5 | 1100 |
|  |  | 2.0 | 90 |
|  |  | 3.0 | 100 |
| 11 | Na salt of acrylic acid/maleic acid | 1.2 | 8000 |
|  |  | 1.5 | 1800 |

Table 1-continued

| Sample No. | Dispersant | Amount of dispersant (% by weight based on CaCO₃) | Viscosity (cps) of 50% by weight aqueous slurry of calcium carbonate |
|---|---|---|---|
| | copolymer, (molar ratio = 100/50, molecular weight = 15000 | 2.0 3.0 | 200 200 |

The results obtained when aqueous dispersions of fine calcium carbonate prepared in the above Example were used for coating paper are described.

The mixing ratio, based on the solids, of starch/calcium carbonate were fixed at to 16.7% by weight/83.3% by weight. The dispersant and water were added so that the viscosity shown in Table 2 was obtained. The properties of the resulting slurry and the kinds and amounts of the dispersants used are shown in Table 2.

Table 2

| Properties of Slurry | Dispersant Sample No. 4 on Table 1 (comparative sample), 2.0% based¹ on CaCO₃ | Sample No. 8 on Table 1 (dispersant of present invention, 1.0% based on CaCO₃ |
|---|---|---|
| Solid Concentration² (%) of Slurry | 48.4 | 48.6 |
| Viscosity (B-type viscometer, cps, 60 rpm, 25° C. | 990 | 960 |
| Viscosity (Hercules viscometer, cps, 1100 rmp, 25° C.) | 28 | 27 |
| pH (pH meter, 25° C.) | 10.3 | 10.2 |

Note
[1] When the amount added of Sample No. 4 was 1.0%, the viscosity was too high and no slurry could be formed. Accordingly, the sample No. 4 dispersant had to be added in an amount of 2.0%, so as to obtain the slurry shown in Table 2.
[2] The total amount of CaCO₃ and starch are regarded as the solid content.

The slurry shown in Table 2 was coated on an uncoated paper having a base weight of 105.3 g/m² by using a coating rod. The coated paper was dried at room temperature and was subjected to a super-calendering treatment (linear pressure=100 Kg/cm, paper feed speed=20 m/min, chilled roll temperature=60° C., paper-passing frequency=5 times). The amount of the solids coated on the paper was 20±1 g/m³. The properties of the resulting coated papers are shown in Table 3.

Table 3

| | Properties of Coated Papers | | | | |
|---|---|---|---|---|---|
| | White Paper Test | | | Printing Test[1] | |
| | Whiteness (%) | Opacity (%) | Gloss (60°—60°) | Gloss (60°—60°) | Ink Setting Time (sec) |
| Coated paper formed by using slurry including comparative Sample No. 4 | 89.2 | 92.0 | 47.5 | 54.3 | 15 |
| Coated paper formed by using slurry including Sample No. 8 of present invention | 89.8 | 92.6 | 48.0 | 54.7 | 14 |

Note:
[1] The test was conducted by using an RI tester manufactured by Akira Seisakusho.

The embodiments of the invention in which an exclusive property or privilege is claimed are defined as follows:

1. An aqueous dispersion consisting essentially of water, calcium carbonate particles having a particle size of from 0.02 to 10 microns and, as a dispersing agent, from about 1 to about 5 wt. %, based on the weight of said calcium carbonate particles, of a salt of an acrylic acid/maleic acid copolymer or mixture thereof, the molar ratio of acrylic acid/maleic acid monomer units in said copolymer being in the range of from 100/5 to 100/200 and said copolymer having a molecular weight of from 1,000 to 20,000.

2. An aqueous dispersion as claimed in claim 1 in which said molar ratio is from 100/10 to 100/100.

3. An aqueous dispersion as claimed in claim 1 in which the molecular weight of said copolymer is from 2000 to 10,000.

4. An aqueous dispersion as claimed in claim 1 in which said salt is an alkali metal salt.

5. An aqueous dispersion as claimed in claim 1 containing from 40 to 60 wt. % of calcium carbonate.

6. A method of preparing an aqueous dispersion of calcium carbonate particles, said dispersion having a high concentration of calcium carbonate particles and a low viscosity, which comprises blending into a mixture consisting essentially of water and calcium carbonate particles having a particle size of from 0.02 to 10 microns, from 1 to 5 wt. %, based on the weight of said calcium carbonate particles, of a salt of an acrylic acid/maleic acid copolymer or mixture thereof, the molar ratio of acrylic acid/maleic acid monomer units in said copolymer being in the range of from 100/5 to 100/200 and said copolymer having a molecular weight of from 1,000 to 20,000.

7. A method according to claim 6 in which said mixture contains from 40 to 60 wt. % of calcium carbonate and the balance is essentially water, said mixture having been obtained by filter-pressing an aqueous slurry obtained by blowing carbon dioxide into an aqueous suspension of calcium hydroxide to form an aqueous slurry containing 15 to 25 wt. % of calcium carbonate.

8. An aqueous dispersion as claimed in claim 1 in which said salt is an ammonium salt.

9. A method according to claim 6 in which said salt is an alkali metal salt.

10. A method according to claim 6 in which said salt is an ammonium salt.

* * * * *